(12) United States Patent
Gough

(10) Patent No.: US 7,965,327 B2
(45) Date of Patent: Jun. 21, 2011

(54) METHOD AND APPARATUS FOR DETECTING CAMERA SENSOR INTENSITY SATURATION

(75) Inventor: Michael L. Gough, Ben Lomond, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 12/328,736

(22) Filed: Dec. 4, 2008

(65) Prior Publication Data

US 2009/0207265 A1  Aug. 20, 2009

Related U.S. Application Data

(63) Continuation of application No. 10/921,692, filed on Aug. 19, 2004, now Pat. No. 7,463,298, which is a continuation of application No. 09/387,068, filed on Aug. 30, 1999, now Pat. No. 6,816,200.

(60) Provisional application No. 60/098,581, filed on Aug. 31, 1998.

(51) Int. Cl.
*H04N 3/14* (2006.01)
*H04N 5/335* (2011.01)

(52) U.S. Cl. ........................................ 348/302; 348/294

(58) Field of Classification Search .................. 348/302, 348/294; 341/155, 161, 169, 170
See application file for complete search history.

(56) References Cited

U.S. PATENT DOCUMENTS

| 4,455,646 | A | | 6/1984 | Bloodworth |
| 5,008,698 | A | | 4/1991 | Muramatsu et al. |
| 5,014,056 | A | | 5/1991 | Moriwaki |
| 5,504,524 | A | * | 4/1996 | Lu et al. ..................... 348/223.1 |
| 5,525,987 | A | | 6/1996 | Izuhara et al. |
| 5,798,519 | A | * | 8/1998 | Vock et al. ................. 250/206.1 |
| 6,002,445 | A | * | 12/1999 | Urayama ....................... 348/572 |
| 6,275,259 | B1 | | 8/2001 | Gowda et al. |
| 6,388,709 | B1 | | 5/2002 | Kobayashi et al. |
| 6,529,211 | B2 | | 3/2003 | Ohara et al. |
| 7,463,298 | B2 | | 12/2008 | Gough |

* cited by examiner

*Primary Examiner* — James M Hannett

(57) ABSTRACT

An apparatus for detecting intensity saturation of a light sensor includes a saturation detector for detecting and measuring an intensity saturation condition of at least one pixel of a light sensor, the intensity saturation condition of the pixel being at saturation upon receiving light with an intensity above a predetermined level, the saturation detector emitting a digital signal with a reserved bit combination indicating the intensity saturation condition of the pixel, and a processor receiving and processing the digital signal from the saturation detector and transmitting a control signal in response to the digital signal to compensate for the intensity saturation condition of the pixel.

20 Claims, 5 Drawing Sheets

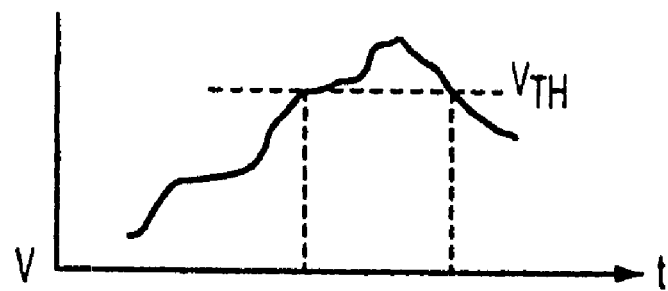
FIG. 3A
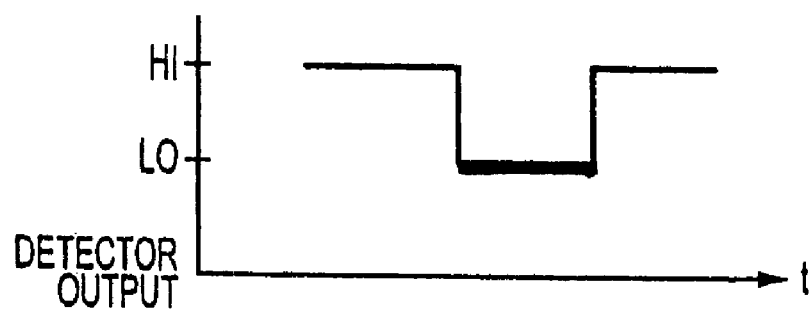
FIG. 3B
| A | B | X |
|---|---|---|
| 0 | 0 | 0 |
| 1 | 0 | 1 |
| 0 | 1 | - |
| 1 | 1 | 0 |
FIG. 4

METHOD AND APPARATUS FOR DETECTING CAMERA SENSOR INTENSITY SATURATION

CROSS REFERENCE TO RELATED APPLICATIONS

This application is a continuation of U.S. Ser. No. 10/921,692, filed on Aug. 19, 2004, now U.S. Pat. No. 7,463,298 which is a continuation of U.S. Ser. No. 09/387,068, filed Aug. 30, 1999, now U.S. Pat. No. 6,816,200, which claims the benefit of U.S. Ser. No. 60/098,581, filed Aug. 31, 1998, all of which are incorporated herein by reference in their entirety and for all purposes.

This application is related to U.S. Ser. No. 12/273,474, filed Nov. 18, 2008, incorporated herein by reference in its entirely for all purposes.

BACKGROUND OF THE INVENTION

This invention relates generally to color digital cameras, and more particularly to the processing of pixel information generated by the sensor of a color digital camera.

Digital color cameras are used with computer or other digital processing systems. Such cameras include a sensor, optics, preprocessing electronics, and a cable or other communication link to transfer data to the digital processing system. Digital cameras are made by Connectix, Intel, and others.

In a conventional digital camera, the sensor is often a charge coupled device (CCD) that produces electrical image signals corresponding to an object producing or reflecting light onto the sensor. The electrical image signals are then processed and recorded on a storage medium such as a memory card or other computer readable medium.

A problem encountered with digital cameras is that the sensor can become saturated when the light intensity exceeds the intensity saturation limit of the sensor. When the light level is above the saturation level of the sensor, all further video information, other than the saturation information, is lost. In the past, this problem has been addressed by attempting to manipulate the amount of light striking the sensor or adjusting the sensor itself.

Some of the prior art has attempted to utilize a light intensity measuring circuit which processes data from the sensor and controls movement of an iris. The iris closes to restrict the amount of incident light striking the sensor and opens to allow more incident light to strike the sensor. However, the movement of the iris is slow compared to other means of intensity adjustment. Furthermore, due to its mechanical nature, the iris often closes more than necessary or doesn't close enough, at which point it must be repositioned. The result is slow correction time and fluctuations in brightness, ending in degradation of picture quality. The latter is especially if utilized with video cameras, where the fluctuating brightness is captured. Furthermore, a solitary bright light can cause the iris to close so much that gradation of the dark regions becomes compressed and deteriorated. The same occurs when direct strong light is incident, such as in the case of strong rear lighting.

In a system in which an electric charge corresponding to an amount of light received is accumulated on a photodiode and passed to an n-layer substrate of the sensor, other prior art has sought to draw away excess voltage that flows from the photodiode of the sensor when an excessive amount of light is received. For example, a p-layer is positioned between the photodiode and substrate of the sensor and grounded. This applies a reverse bias voltage to the substrate and p-layer so that a depletion layer is formed between the photodiode and the substrate. Surplus electric charges that overflow from the photodiode, due to an excessive amount of received light, are absorbed in the depletion layer. The voltage of the substrate is then adjusted to accommodate bright and dark scenes. A great disadvantage is that signals from the photodiodes are disrupted in that they must now pass through a layer specifically designed to absorb such signals. Another disadvantage of this is that the voltage of the substrate must be preset based on estimated light conditions, especially disadvantageous for capturing moving video. Another disadvantage is that the voltage of the entire substrate must be changed, not just for the portion receiving the excessively intense light. This results in poor picture quality in that bright areas of light are compensated for but dim spots are not.

Another problem encountered with digital cameras is that picture quality drops as the light intensity falls below a certain level. Furthermore, even images in a dark portion of a scene can be hard to observe if a direct strong light is incident in the scene. The prior art has attempted to correct such problems by monitoring signals from the sensor that have been separated into red, green and blue component signals and have also been gamma corrected. Then, a dark area proportion in a whole picked up image is detected. Next, a portion of the processed original signal is modified to stretch the dark signal region to improve the gradation of the dark area. The processed original signal and the modified signal are combined to output a resultant gradation improved signal. The disadvantage of this prior art method is that separation and gamma correction of the original signal are performed before the dark area is detected. This reduces the accuracy of the detection of the dark area. Further, the dark area is estimated from the processed original signal as a whole, not on a pixel by pixel basis, further reducing the accuracy of the detection of the dark area and making correction of the dark area more difficult.

SUMMARY OF THE INVENTION

In the present invention, an electrical signal from a light sensor is monitored to detect an intensity saturation condition of at least one pixel of the light sensor. The intensity saturation condition of the pixel is at saturation upon receiving light with an intensity above a predetermined level and below saturation upon receiving light with an intensity below a predetermined level. The electrical signal is converted to a digital signal. A reserved bit combination is imposed on the digital signal indicating the intensity saturation condition of the pixel. A control signal is transmitted in response to the bit combination of the digital signal to compensate for the intensity saturation condition of the pixel. An analog to digital converter can be utilized to convert the electrical signal to the digital signal. The analog to digital converter may be programmable to receive electrical signals of different intensities from the light sensor.

Monitoring the electrical signal may include determining whether a voltage of an electrical signal from the light sensor is above a predetermined level. Further, the control signal may reset the predetermined level of voltage. The analog to digital converter may form part of an analog to digital circuit that also includes an AND gate and an OR gate.

The electrical signal from the light sensor may include a series of signals scanned from preselected pixels from an array of pixels of the sensor, or may include a series of signals scanned pixel by pixel from the array of pixels of the sensor.

In one aspect of the invention, an integrated circuit may perform the aforementioned actions. The integrated circuit may form part of a camera module. Optionally, the camera module may further include the light sensor, a lens assembly aligned with the light sensor, and a printed circuit board supporting the integrated circuit.

In another embodiment of the present invention, pixel data from an output of a light sensor is monitored to determine a number of pixels at saturation. The number of pixels at saturation are compared to a predetermined threshold number. The light sensor is reprogrammed to adapt to more brightness if the number of pixels at saturation is above the threshold number. The light sensor may also be programmed to adapt to less brightness if the number of pixels at saturation is below the threshold number.

A saturation detector may be coupled to the light sensor for detecting an intensity saturation condition of the light sensor. The saturation detector can be reprogrammed to adapt to more brightness if the number of pixels at saturation is above the threshold number. The monitoring of the pixel data may be performed without disturbing data flow. Optionally, reprogramming of the saturation detector can be performed in predetermined increments.

In yet another embodiment of the present invention, pixel data from an output of a light sensor is monitored to determine a number of pixels near saturation. The number of pixels near saturation are compared to a predetermined threshold number. The light sensor is reprogrammed to adapt to less brightness if the number of pixels near saturation is below the threshold number.

A saturation detector may be coupled to the light sensor to detect an intensity saturation condition of the light sensor. The saturation detector may be reprogrammed to adapt to less brightness if the number of pixels at saturation is below the threshold number. Optionally, reprogramming of the saturation detector may be performed in predetermined increments. The pixel data may also be monitored without disturbing data flow.

In still yet another embodiment of the present invention, pixel data from an output of a light sensor is monitored to determine a number of pixels at saturation and a number of pixels near saturation. The number of pixels at saturation is compared to a predetermined first threshold number and the number of pixels near saturation are compared to a predetermined second threshold number. The light sensor is reprogrammed to adapt to more brightness if the number of pixels at saturation is above the first threshold number. The light sensor is reprogrammed to adapt to less brightness if the number of pixels near saturation is below the second threshold number.

In one aspect of the invention, a saturation detector may be coupled to the light sensor to detect an intensity saturation condition of the light sensor. The saturation detector can be reprogrammed to adapt to more brightness if the number of pixels at saturation is above the first threshold number, and can be reprogrammed to adapt to less brightness if the number of pixels near saturation is below the second threshold number. Optionally, reprogramming of the saturation detector can be performed in predetermined increments. Also, monitoring the pixel data may be performed without disturbing data flow.

In yet another embodiment of the present invention, a saturation detector detects and measures an intensity saturation condition of at least one pixel of a light sensor. The saturation detector emits a digital signal with a reserved bit combination indicating the intensity saturation condition of the pixel. A processor receives and processes the digital signal from the saturation detector and transmits a control signal in response to the digital signal to compensate for the intensity saturation condition of the pixel.

The saturation detector may include a voltage detector for determining whether a voltage of an electrical signal from the light sensor is above a predetermined level. The voltage detector may be programmable such that the control signal resets the predetermined level of the voltage. The saturation detector may include an analog to digital converter for converting an electrical signal from the light sensor into a digital signal for indicating the intensity saturation condition of the pixel. Optionally, the analog to digital converter may be programmable to convert electrical signals of different intensities. Also, the analog to digital converter may form part of an analog to digital circuit that also includes an AND gate and an OR gate The present invention detects situations where too much light is being received, or too little light is being received. When such conditions are detected, they may be corrected by altering the setting of an ADC and a voltage detector on a preprocessor, and by altering the gamma correction and color correction on a host or digital processor. Such gamma and color correction can take place on a pixel by pixel basis.

An intensity saturation condition for each of the pixels of the light sensor may be detected, and a reserved bit combination may be imposed on an ADC output bus to inform a digital processor of the saturation condition for some or each of the independent pixels. A digital processor can use this information to control the ADC to compensate for the saturation condition.

Because the saturation condition of individual pixels is scanned, gamma and color correction may take place on a pixel-by-pixel basis, providing the advantage of producing excellent picture quality free of excessively bright and dim areas. Further, random sampling may be used to reduce the consumption of electric power.

These and other advantages of the present invention will become apparent to those skilled in the art upon a reading of the following descriptions of the invention and a study of the several figures of the drawing.

BRIEF DESCRIPTION OF THE DRAWINGS

FIGS. 3a and 3b shows a waveform illustrating operation of the voltage detector shown in FIG. 2;

FIG. 4 is a table of the logic of the XOR gate;

DETAILED DESCRIPTION OF THE PREFERRED EMBODIMENTS

Figure 1:
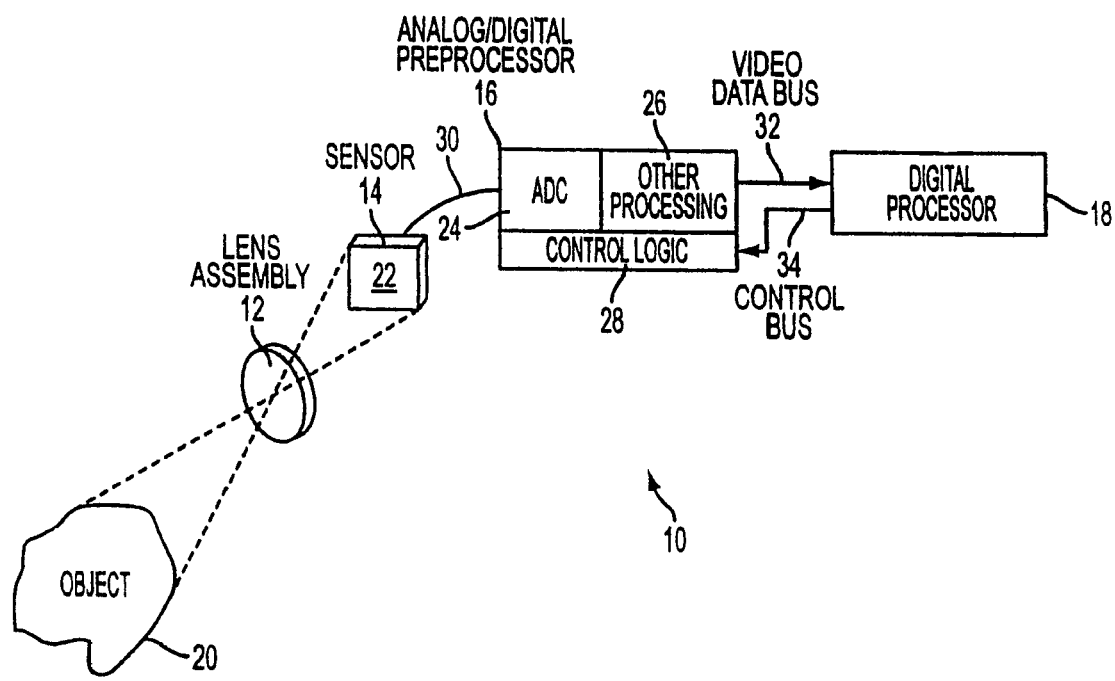
FIG. 1 is a block diagram of a camera system including an apparatus for detecting camera sensor intensity saturation.

In FIG. 1, a digital video camera system 10 includes a lens assembly 12, a sensor 14 for converting incident light into a video signal, an analog/digital preprocessor 16, and a digital processor 18. The lens assembly 12 focuses an image of an object 20 on a surface 22 of the sensor 14. Often, the lens assembly 12, sensor 14, and preprocessor 16 are housed within a common housing or enclosure (not shown). The digital processor 18 may, in some circumstances, also be housed within the same enclosure. However, in many instances the digital processor 18 can be an external processor, such as a microcomputer.

The lens assembly can be in any suitable form, including a simple plastic lens assembly or a complex multi-lens optical assembly, depending upon the application. The sensor 14 is one of a variety of solid-state sensors made by, for example, charge coupled device (CCD) or complementary metal oxide semiconductor (CMOS) technologies.

The preprocessor 16 preferably includes a number of sections including an analog to digital converter (ADC) 24, other processing circuitry 26, and control logic 28. Analog sensor data is input into the preprocessor 16 over an analog bus 30, and digital sensor data is output from the preprocessor 16 over digital bus 32. The digital processor 18 receives the digital "video" data over bus 32, and provides control signals to the preprocessor 16 over control bus 34. As will be discussed in greater detail below, the preprocessor 16 of the present invention detects an intensity saturation condition on the analog "video" bus 30, informs the digital processor 18 of the condition by a particular bit pattern over the digital video bus 32, and then the digital processor 18 provides appropriate control signals over the control bus 34 to compensate for the saturation condition.

Figure 2:
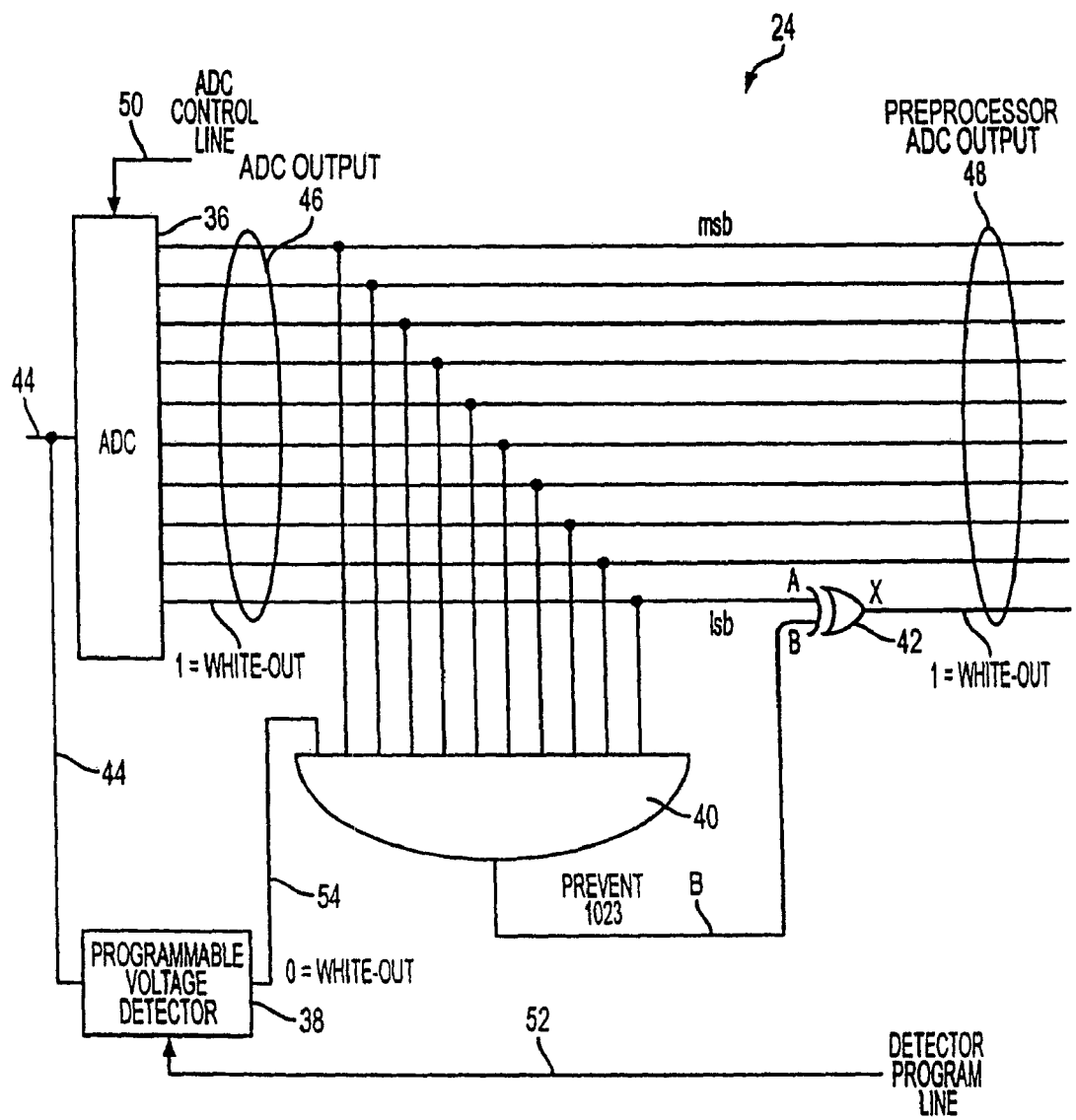
FIG. 2 is a schematic of the camera sensor intensity saturation apparatus of FIG. 1.

In FIG. 2, the ADC circuit 24 of the present invention is shown in greater detail. More particularly, one embodiment of ADC circuit 24 includes a programmable ADC 36, a programmable voltage detector 38, an AND gate 40, and an exclusive or (XOR) gate 42. The ADC in the present example receives an analog input on a line 44 and has ten (10) output lines 46 as the ADC output. These outputs range from the most significant bit (msb) to the least significant bit (lsb). The circuitry and logic of the ADC circuitry 24 imposes a particular bit pattern on the preprocessed ADC output 48 when the intensity level on the line 44 exceeds a predetermined value or threshold, or is otherwise detected to be in saturation. The particular bit pattern chosen in this embodiment is "1111111111" in binary or "1023" in decimal.

The ADC 36 is a conventional programmable ADC circuit that takes the analog signal on line 44 and converts it to digital signal on bus 48. Therefore, this ADC has ten bits of resolution. Other embodiments have more, none or fewer bits of resolution. The signal on line 46 is a series of signals scanned pixel-by-pixel from the array of pixels on the surface 22 of sensor 14. The ADC 36 can be controlled as far as sensitivity to different intensity ranges via an ADC control line 50 forming a part of the control bus 36 from the digital processor 18.

The programmable voltage detector 38 is used to detect the voltage level on line 44 to determine when a particular pixel is saturated. When the pixel is saturated, the ADC output is set to all 1's to signal a saturation condition for that pixel. It should therefore be noted that the saturation detection is on a pixel-by-pixel basis, and that the digital processor 18 can act upon the pixel saturation information to control the ADC via ADC control line 50.

The actual threshold $V_{TH}$ detected by the detector 38 can be set by a detector program line 52. More particularly, the detector 38 can include a register that can be programmed via line 52 to determine the threshold voltage $V_{TH}$ on line 44 which will create a digital output signal on a line 54. In the present embodiment, the digital output signal on line 54 is "1" or "HI" when the voltage V on the line 44 is below $V_{TH}$, and the digital output signal on line 54 is "0" or "LO" when the voltage V on the line 44 is above $V_{TH}$. Therefore, in this embodiment, a LO signal on the line 54 indicates a saturation or "whiteout" condition. FIG. 3 illustrates the relationship between the voltage V on line 44 and the output of the detector 38. Of course, other circuits can be used to determine a saturation condition for the sensor array. Voltage threshold detection is only one method for accomplishing this task.

The AND gate 40 has 11 inputs, where one input is coupled to the output line 54 of the detector 38, and where the remaining 10 inputs are coupled to the ADC output bus 46. Therefore, the output of the AND gate 40 on a line B will be "1" or "HI" only when the bus 46 is at 1111111111 (in binary) and when the voltage V on input line 44 is below $V_{TH}$. Under these conditions, the output X of XOR 42 is forced to 0 (LO), forcing the output of preprocessed ADC output bus 48 to 1111111110. This is because the output on the bus 48 of 1111111111 is reserved to signal a saturation condition.

When the voltage V on line 44 is above the threshold voltage $V_{TH}$, the output of the ADC on bus 46 will be 1111111111, and the signal on line 54 will be 0. This will cause the output of the AND gate 40 to go "LO" or "0", allowing the output of the XOR 42 to become the same as the lsb on bus 46, i.e. to become 1. The output bus 48 will therefore be 1111111111, signaling the saturation of that pixel. When the output on the bus 46 is other than 1111111111, the output of the AND gate 40 will be 0, and the data on the bus 48 will be the same as the data on the bus 46.

The logic of the XOR gate 42 is shown in FIG. 4. That is, when the input on line B to the XOR gate 42 is LO, then the output of the XOR gate is the same as the input on line A. The condition where A is LO and B is HI is impossible, since a LO signal on A would force B LO as well. When both A and B are both HI, then x is forced LO by the XOR gate 42.

Figure 5:
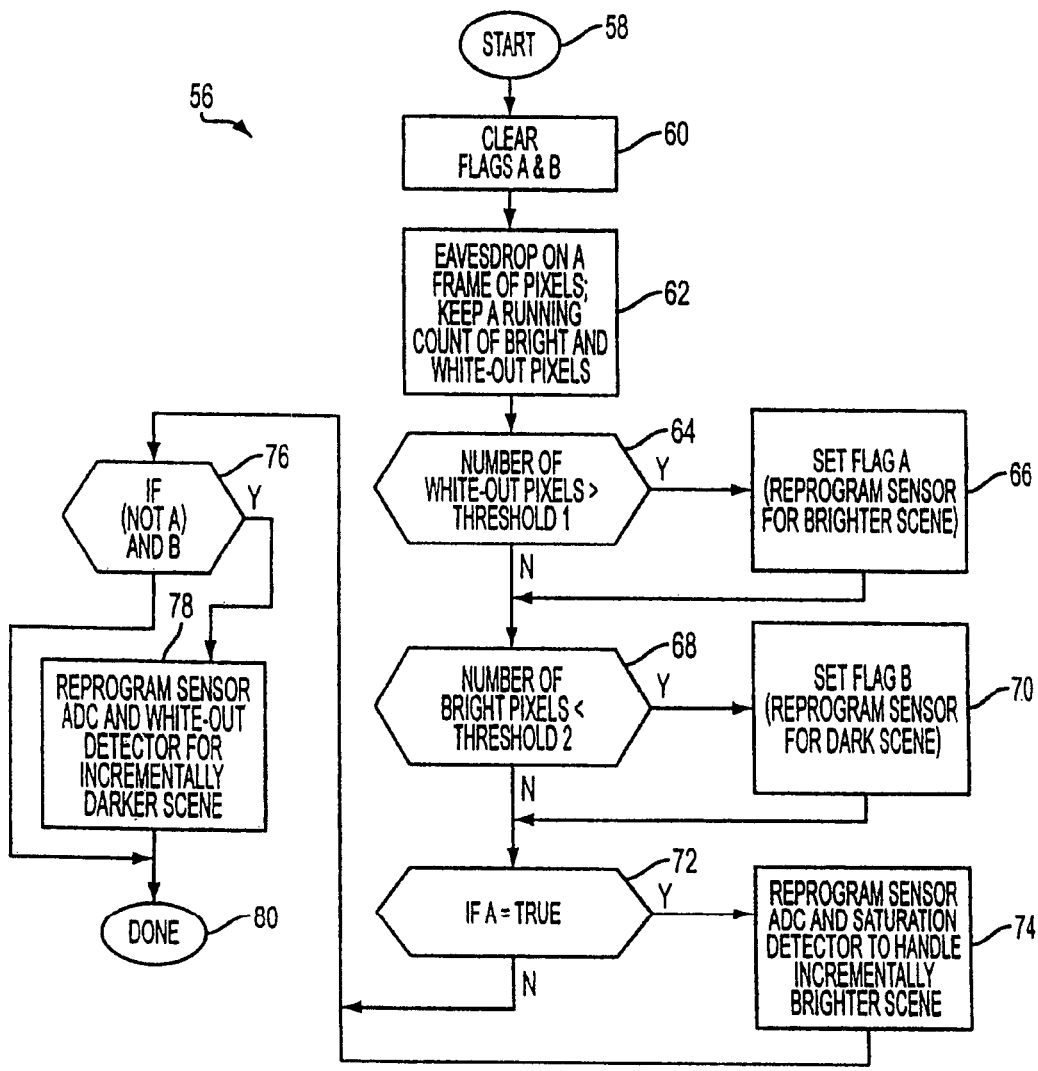
FIG. 5 is a flow diagram for a process implemented by the digital processor of FIG. 1 to control the ADC of FIG. 2 in response to the detection of an intensity saturation condition of the sensor.

In FIG. 5, a process 56 for detecting camera sensor intensity saturation as implemented by a digital processor 18 begins at 58, and the flags "A" and "B" are cleared in an operation 60. Then, in an operation 62, the process "eavesdrops" on a frame of pixels; keeping a running count of bright and whiteout pixels. By "eavesdrops" it is meant that the process does not disturb the data flow, but merely monitors the pixel data as it is received. This is usually accomplished by using a few registers to keep count of certain pixel types, including bright and whiteout pixels. A "bright" pixel is near, but not yet at, saturation. A "whiteout" pixel is at saturation, and is designated by "1111111111" in this example.

Next, in a decision operation 64, it is determined whether the number of whiteout pixels are greater than a threshold1 number. A typical threshold1 number for whiteout pixels depends upon the brightness of a scene, but for an average scene, the threshold1 may be about 20 whiteout pixels. If it is greater than the threshold1, an operation 66 sets flag A to indicate that the preprocessor 16 should be reprogrammed for a brighter scene. This is accomplished, at least in part, by reprogramming the ADC 50 and the voltage detector 38.

Operation 68 determines whether the number of bright pixels is less than a threshold2, which is typically about 50, but which again is dependent upon the scene. If it is less than the threshold, operation 70 sets flat B to flag that the preprocessor 16 should be reprogrammed for a darker scene. This, again, is accomplished in part by reprogramming the ADC 50 and the voltage detector 38.

Operation 72 determines whether the A flag has been set. If so, operation 74 reprograms the ADC 50 and the voltage detector 38 to handle an incrementally brighter scene. The ADC 50 is programmed to cover a wider range of voltages with the same number of bit combinations. The voltage detector 38 is reprogrammed to raise the threshold voltage $V_{TH}$. This is accomplished incrementally to avoid making too large of a step.

Operation 76 determines whether the B flag is set and the A flag is not set. If these conditions are true, then an operation 78 reprograms the sensor ADC 36 and the voltage detector 38. More particularly, the ADC 50 is programmed to cover a narrower range of voltages for the same number of bit combinations. The voltage detector 38 is reprogrammed to lower the threshold voltage $V_{TH}$. This is accomplished incrementally to avoid making too large of a step. The process 56 is then completed at 80 awaiting the next frame of data.

Figure 6:
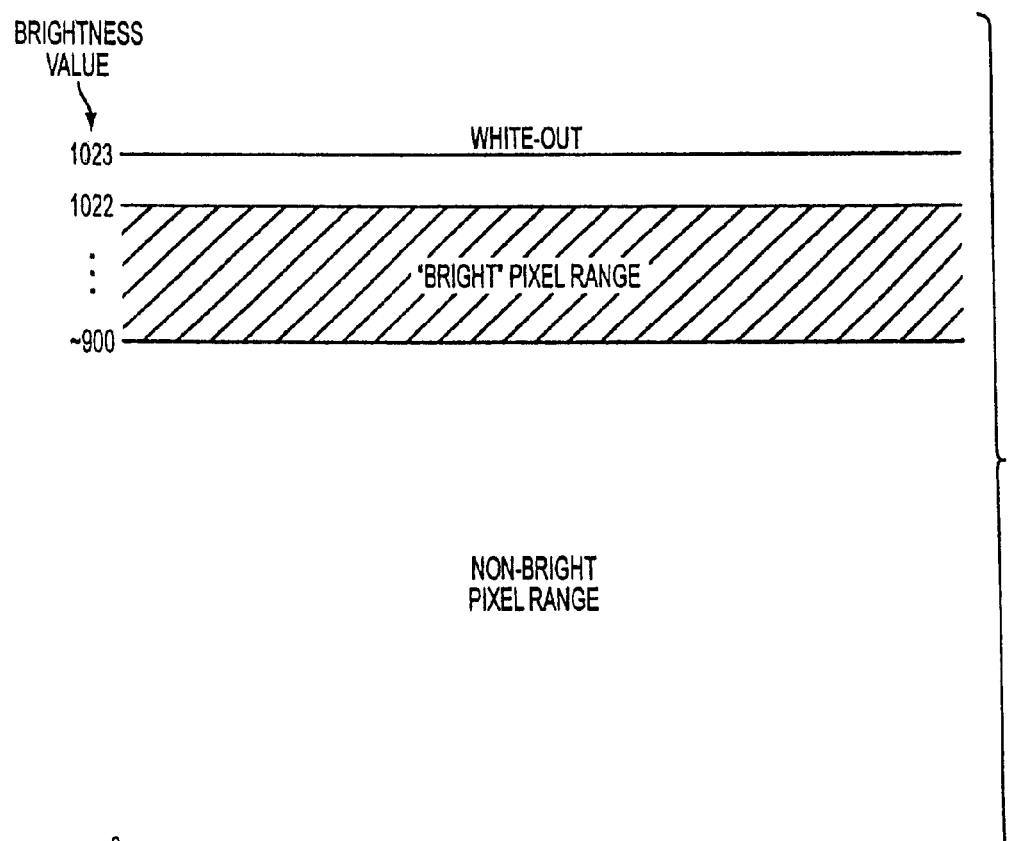
FIG. 6 is a diagram illustrating the brightness value ranges associated with pixel data from a camera sensor.

FIG. 6 illustrates the different categories of brightness in the present example. Here, the value 1023 represents whiteout, while values of about 900 to 1022 represent the bright pixel range. Values below about 900 represent the non-bright pixel range.

It will therefore be appreciated that the process and apparatus of the present invention detects a saturation condition and forces a digital output bus to a predetermined pattern to indicate the saturation condition. The process and apparatus of the present invention prevents the predetermined pattern from occurring when the saturation condition is not present.

It will further be appreciated that the present invention detects situations where too much light is being received, or too little light is being received. When such conditions are detected, they are corrected by altering the setting of an ADC and a voltage detector on a preprocessor, and by altering the gamma correction and color correction on a host or digital processor, as will be appreciated by those skilled in the art.

It should be noted that the logic used in the example of FIGS. 1 and 2 and the processes illustrated in FIG. 5 exemplify only one implementation of the present invention. Those skilled in the art will appreciate that other logic components can accomplish the design goals of the present invention. For example, NAND gates, OR gates, inverters and other forms of logic can be used to accomplish the goals of the invention, which includes the detection of a saturation condition, the imposition of a particular bit pattern on the video output bus, and the correction of the saturation condition in response thereto. Likewise, alternative process operations can be used to implement the present invention.

A method for detecting intensity saturation of a light sensor includes monitoring an electrical signal from a light sensor for detecting an intensity saturation condition of at least one pixel of the light sensor, converting the electrical signal to a digital signal, imposing a reserved bit combination on the digital signal indicating the intensity saturation condition of the pixel, and transmitting a control signal in response to the digital signal to compensate for the intensity saturation condition of the pixel. Alternatively stated, the method includes monitoring pixel data from an output of a light sensor to determine a number of pixels at saturation and a number of pixels near saturation, comparing the number of pixels at saturation to a predetermined first threshold number, comparing the number of pixels near saturation to a predetermined second threshold number, reprogramming the light sensor to adapt to more brightness if the number of pixels at saturation is above the first threshold number, and reprogramming the light sensor to adapt to less brightness if the number of pixels near saturation is below the second threshold number.

What is claimed is:

1. An apparatus comprising:
    a light sensor;
    a sensitivity adjustment circuit that generates outputs based on a signal received from the light sensor, wherein the sensitivity adjustment circuit comprises a detector that compares the signal received from the light sensor to a threshold; and
    a lighting condition adjustment circuit that determines a number of the outputs of the sensitivity adjustment circuit that satisfy a condition, wherein the lighting condition adjustment circuit reprograms the threshold of the detector based on the number of the outputs of the sensitivity adjustment circuit that satisfy the condition.

2. The apparatus of claim 1 wherein the light sensor comprises pixels, wherein the lighting condition adjustment circuit determines a number of the pixels that are in saturation based on the number of the outputs of the sensitivity adjustment circuit that satisfy the condition, and wherein the lighting condition adjustment circuit reprograms the threshold of the detector based on the number of the pixels that are in saturation.

3. The apparatus of claim 1 wherein the light sensor comprises pixels, wherein the lighting condition adjustment circuit determines a number of the pixels that are less than a threshold number that represents the condition, and wherein the lighting condition adjustment circuit reprograms the threshold of the detector based on the number of the pixels that are less than the threshold number.

4. The apparatus of claim 1 wherein the light sensor comprises pixels, wherein the lighting condition adjustment circuit determines a number of the pixels that are greater than a threshold number that represents the condition, and wherein the lighting condition adjustment circuit reprograms the threshold of the detector based on the number of the pixels that are greater than the threshold number.

5. The apparatus of claim 1 wherein the lighting condition adjustment circuit adjusts a control signal to cause the sensitivity adjustment circuit to cover a different range of levels of the signal received from the light sensor.

6. The apparatus of claim 1 wherein the detector is a programmable voltage detector.

7. The apparatus of claim 1 wherein the lighting condition adjustment circuit generates a control signal that adjusts the threshold of the detector based on the number of the outputs of the sensitivity adjustment circuit that satisfy the condition.

8. The apparatus of claim 7 wherein the light sensor comprises pixels, and wherein the lighting condition adjustment circuit causes the threshold of the detector to be reprogrammed based on a number of the pixels that satisfy the condition to compensate for a brightness detected by the light sensor.

9. An apparatus comprising:
    a light sensor;
    a sensitivity adjustment circuit that receives a signal generated by the light sensor; and
    a lighting condition adjustment circuit that determines a number of outputs of the light sensor that satisfy a condition based on output signals of the sensitivity adjustment circuit,
    wherein the lighting condition adjustment circuit causes the sensitivity adjustment circuit to cover a different range of levels of the signal generated by the light sensor based on the number of the outputs of the light sensor that satisfy the condition.

10. The apparatus of claim 9 wherein the number of the outputs of the light sensor represents a number of pixels in the light sensor, and wherein the lighting condition adjustment circuit generates a control signal that causes the sensitivity adjustment circuit to cover a different range of levels of the signal generated by the light sensor based on a comparison between the number of the pixels and a threshold that represents the condition.

11. The apparatus of claim 9 wherein the sensitivity adjustment circuit comprises a detector that compares the signal generated by the light sensor to a threshold, and wherein the lighting condition adjustment circuit generates a control signal that adjusts the threshold of the detector based on the number of the outputs of the light sensor that satisfy the condition.

12. The apparatus of claim 11 wherein the lighting condition adjustment circuit reprograms the threshold of the detector based on a number of pixels in the light sensor that satisfy the condition to compensate for a brightness detected by the light sensor.

13. The apparatus of claim 12 wherein the lighting condition adjustment circuit reprograms the threshold of the detector based on a number of the pixels that are in saturation.

14. The apparatus of claim 9 wherein the lighting condition adjustment circuit determines a number of pixels in the light sensor that are in saturation based on the number of the outputs of the light sensor that satisfy the condition, and wherein the lighting condition adjustment circuit generates a control signal that causes the sensitivity adjustment circuit to cover a different range of levels of the signal generated by the light sensor based on the number of the pixels that are in saturation.

15. A method comprising:
generating a sensor signal using a light sensor;
receiving the sensor signal at a sensitivity adjustment circuit;
determining a number of outputs of the sensitivity adjustment circuit that satisfy a condition; and
reprogramming a threshold of a detector in the sensitivity adjustment circuit based on the number of the outputs of the sensitivity adjustment circuit that satisfy the condition.

16. The method of claim 15 wherein determining a number of outputs of the sensitivity adjustment circuit that satisfy a condition further comprises determining a number of pixels in the light sensor that are in saturation based on the number of the outputs of the sensitivity adjustment circuit that satisfy the condition, and
wherein reprogramming a threshold of a detector in the sensitivity adjustment circuit based on the number of the outputs of the sensitivity adjustment circuit that satisfy the condition further comprises reprogramming the threshold of the detector based on the number of the pixels that are in saturation.

17. The method of claim 15 wherein determining a number of outputs of the sensitivity adjustment circuit that satisfy a condition further comprises comparing a number of pixels in the light sensor that are in saturation to the threshold that represents the condition.

18. A method comprising:
generating a sensor signal in a light sensor;
receiving the sensor signal at a sensitivity adjustment circuit;
determining a number of outputs of the light sensor that satisfy a condition based on output signals of the sensitivity adjustment circuit; and
generating a control signal that causes the sensitivity adjustment circuit to cover a different range of levels of the sensor signal based on the number of the outputs of the light sensor that satisfy the condition.

19. The method of claim 18 wherein determining a number of outputs of the light sensor that satisfy a condition based on output signals of the sensitivity adjustment circuit further comprises comparing a number of pixels in the light sensor to a threshold to generate a comparison output, and
wherein generating a control signal that causes the sensitivity adjustment circuit to cover a different range of levels of the sensor signal based on the number of the outputs of the light sensor that satisfy the condition further comprises generating the control signal based on the comparison output.

20. The method of claim 18 wherein determining a number of outputs of the light sensor that satisfy a condition based on output signals of the sensitivity adjustment circuit further comprises determining a number of pixels in the light sensor that are in saturation based on the number of the outputs of the light sensor that satisfy the condition, and
wherein generating a control signal that causes the sensitivity adjustment circuit to cover a different range of levels of the sensor signal based on the number of the outputs of the light sensor that satisfy the condition further comprises generating the control signal based on the number of the pixels that are in saturation.

* * * * *